United States Patent [19]
Turmel et al.

[11] Patent Number: 6,080,224
[45] Date of Patent: Jun. 27, 2000

[54] METHOD FOR PROCESSING WASTE CONTAINING METAL CONTAMINANTS USING A REDUCING AGENT

[75] Inventors: Jean-Michel Turmel, Saint-Donan; Jean Rocherulle, Liffre, both of France; Paul Grange, Bierges, Belgium; John Razafindrakoto, Thorigné-Fouillard, France; Patrick Verdier, Acigne, France; Yves Laurent, Thorigné-Fouillard, France

[73] Assignee: Cernix, France

[21] Appl. No.: 09/065,029

[22] PCT Filed: Oct. 24, 1996

[86] PCT No.: PCT/FR96/01662

§ 371 Date: Apr. 22, 1998

§ 102(e) Date: Apr. 22, 1998

[87] PCT Pub. No.: WO97/15355

PCT Pub. Date: May 1, 1997

[30] Foreign Application Priority Data

Oct. 24, 1995 [FR] France ................... 95 12505

[51] Int. Cl.⁷ ....................................... C22B 1/00
[52] U.S. Cl. ................... 75/401; 75/416; 75/961; 423/5; 588/11
[58] Field of Search .............. 75/401, 416, 751, 75/773, 961; 588/11; 423/5

[56] References Cited

U.S. PATENT DOCUMENTS

| | | | |
|---|---|---|---|
| 4,094,809 | 6/1978 | Ross | 588/11 |
| 4,395,367 | 7/1983 | Rohrmann et al. | |
| 5,104,494 | 4/1992 | Tench et al. | 205/125 |
| 5,662,579 | 9/1997 | Bickford | 588/256 |

FOREIGN PATENT DOCUMENTS

| | | |
|---|---|---|
| 0551056 | 7/1993 | European Pat. Off. |
| 4124101 | 1/1993 | Germany |
| 9322001 | 11/1993 | WIPO |

*Primary Examiner*—Prince Willis
*Assistant Examiner*—Tima McGuthry-Banks
*Attorney, Agent, or Firm*—Blakely Sokoloff Taylor & Zafman

[57] ABSTRACT

The invention relates to a method for processing waste that contains contaminants. The contaminants may be metals modified by carbon, oxygen, phosphorus, or sulfur. The waste in the form of a powder is mixed with an ionic reducing agent in an inert liquid medium. The mixture is melted to give a first liquid phase and a second metal phase. The two phases are separated and solidified to enable disposal or temporary storage of the first liquid phase and to enable recycling of the second metal phase. The method is useful for inerting or reclaiming waste containing metal contaminants.

14 Claims, No Drawings

METHOD FOR PROCESSING WASTE CONTAINING METAL CONTAMINANTS USING A REDUCING AGENT

BACKGROUND OF THE INVENTION

1. Field of the Invention

The invention relates to a method for processing waste containing metal contaminants. It further relates to applications of this method, in particular in the iron and steel or car industry or in the field of the recovery of household garbage.

2. Background Information

The metal contaminants in question within the context of the present invention are, in particular, metals modified by carbon, oxygen, phosphorus or sulfur, with a view to their inerting and to their recovery for the purpose of reclaiming the same.

Methods are already known which are intended for processing waste containing metal contaminants.

By way of example, it is possible to cite the pyrometallurgical processing methods based on a reduction of the metal contaminants by carbon at high temperature, such as the IMS—Tetronics or Waelz methods.

However, these methods are not entirely satisfactory to the extent that they are essentially costly, difficult to implement and do not always enable the recovery of all the reclaimable metals.

Accordingly, there is a need to provide a method for processing such waste which is more economical, easier to exploit and more profitable than those which are already in existence, this method further guaranteeing in a reliable manner the inerting of the metal contaminants.

SUMMARY OF THE INVENTION

The object of the invention is to provide a method for processing waste containing metal contaminants, which combines the aforementioned advantages and by which it is further possible to recover the majority of the reclaimable metals.

This is achieved, according to the invention, by carrying out the following operations:

- the mixing of said waste, in the pulverulent condition, with an ionic reducing agent in an inert liquid medium, in particular molten glass, the reducing agent being less electronegative than oxygen and, where appropriate, a supplementary mineral vitrification charge based on silica ($SiO_2$) and/or alumina ($Al_2O_3$),
- the fusion of the mixture to produce a first liquid phase and a second metal phase, and
- the separation and solidification of the two phases with a view to the disposal or temporary storage of the first phase and the recycling of the second phase.

BRIEF DESCRIPTION OF THE DRAWINGS

No Figures are supplied with this patent.

DETAILED DESCRIPTION OF THE INVENTION

According to the invention, the use of aluminum nitride as reducing agent is excluded.

Preferably, the waste is mixed, in the pulverulent condition, with a reducing agent having a percentage of ionic character within the range between 20 and 50%.

According to the invention, the percentage of ionic character of the reducing agent is calculated in accordance with the Pauling method. In fact, Pauling proposed an evaluation of the percentage of ionic character in compounds on the basis of the difference of electronegativity between the elements. Thus, for example in the case of boron nitride BN, the difference of electronegativity between nitrogen and boron is:

$$\Delta = \chi_N - \chi_B$$

where $\chi_N$ and $\chi_B$ are, respectively, the electro-negativities of nitrogen and of boron.

In the present case of BN, $$\Delta = 3.04 - 2.04$$

$$\Delta = 1.$$

A result of this is a percentage of ionic character of 22%, and, consequently, a percentage of covalent character of 78%.

Table I hereinbelow gives the difference of electronegativity of various compounds and the percentage of ionic character:

TABLE I

| Reducing-agent family | Chemical formula of the reducing agent | Δ | Percentage of ionic character |
|---|---|---|---|
| Saline hydrides | Li H | 1.22 | 31 |
|  | Ca H$_2$ | 1.20 | 30 |
|  | LiAlH$_4$ | 0.90 | 19 |
| Saline carbides | Al$_4$ C$_3$ | 0.94 | 20 |
|  | Ca C$_2$ | 1.55 | 45 |
| Saline sulfides | Na$_2$S | 1.65 | 49 |
|  | Ca S | 1.58 | 46 |
|  | Fe S | 0.75 | 14 |
|  | Zn S | 0.93 | 20 |
| Saline nitrides | Li$_3$N | 2.06 | 65 |
|  | Ca$_3$N$_2$ | 2.04 | 65 |
|  | Mg$_3$N$_2$ | 1.73 | 52 |
|  | Be$_3$N$_2$ | 1.47 | 42 |
|  | LaN | 1.94 | 61 |
|  | Si$_3$N$_4$ | 1.14 | 28 |
|  | BN | 1.00 | 22 |

Table II hereinbelow gives the electro-negativities $\chi$ of various elements.

TABLE II

| Elements | $\chi$ |
|---|---|
| Hydrogen [sic] | 2.20 |
| Sulfur | 2.58 |
| Carbon | 2.55 |
| Nitrogen | 3.04 |
| Oxygen | 3.44 |

The method according to the invention reveals the metal or the metal phase by reaction in the liquid phase between metal cations present in the waste and the reducing-agent ions. The metal cations are represented hereinbelow by $Me^{x+}$, x being within the range between 1 and 8. The reducing agent ions are, for their part, symbolized by $E^{n-}$, n being within the range between 1 and 4. The reaction scheme is the following:

$$x\, E^{n-} + n\, Me^{x+} \rightarrow x\, E^o + nM^o \qquad (1)$$

In order that this reaction should take place, it is necessary that the reducing agent $E^{n-}$ should have a percentage of ionic character which is sufficiently high. However, it is desirable that this percentage should nevertheless not exceed a certain value. In fact, as from a certain threshold, the reaction leads to the formation of compounds which are very sensitive to the humidity of the air. These are therefore compounds which are difficult to handle because they decompose rapidly, giving rise to substances which are in some cases explosive and, at the very least, hazardous. The reaction taking place in the course of the method according to the invention is illustrated hereinbelow for various types of metal oxides and of reducing agents. Where sulfides or carbides are chosen as reducing agents, these give rise to the formation of sulfur or of carbon:

$$Cr_2O_3 + 3\ Na_2S \rightarrow 3\ Na_2O + 3S + 2Cr$$

$$NiO + CaC_2 \rightarrow CaO + 2C + Ni$$

$$FeO + CaC_2 \rightarrow CaO + 2C + Fe$$

$$Cr_2O_3 + 3\ CaC_2 \rightarrow 3\ CaO + 6C + 2Cr$$

$$CoO + CaC_2 \rightarrow CaO + 2C + Co$$

$$NiO + CaC_2 \rightarrow CaO + 2C + Ni$$

The sulfur or the carbon formed by this reaction migrates essentially towards the interior of the vitreous phase. Nevertheless, it is likewise probable that a small proportion of sulfur or of carbon will migrate into the metal phase. In other words, the method according to the invention may lead to the introduction of sulfur or of carbon into the metal lattice.

Where a compound of hydride type is chosen as reducing agent, the following reaction is, for example, obtained:

$$CoO + CaH_2 \rightarrow CaO + Co + H_2.$$

It is observed that this reaction leads to the liberation of hydrogen. Clearly, such gaseous liberation is undesirable, having regard to the large number of precautions to be taken for the handling of this gas.

Where a compound of nitride type is chosen as reducing agent, the reaction between this nitride and the metal oxide leads, inter alia, to the formation of nitrogen. In the course of the performance of the method according to the invention, the nitrogen appears in the form of bubbles in the mixture being fused. Naturally, such bubbles have the effect of, if not preventing, at least retarding the speed of agglomeration of the particles of the metal phase.

It will be noted that the use of aluminum nitride as reducing agent leads, for example with iron oxide, to the reaction $$3FeO + 2\ AlN \rightarrow Al_2O_3 + 3\ Fe + N_2.$$

In reality, the reaction of aluminum nitride with a metal contaminant generally gives rise to the formation of alumina $Al_2O_3$. This compound has the disadvantage of reacting with certain metal oxides to form very stable aluminates. In the majority of cases, these aluminates retain the metals concerned and, as a result, prevent their recovery. Thus, for example, zinc oxide (ZrO) [sic] reacts in situ with $Al_2O_3$, to lead to the spinel phase $ZnAl_2O_4$, which subsists in the vitroceramic phase.

In this connection, it is moreover noted that the use of reducing agent compounds comprising aluminum, in particular AlN or $Al_4C_3$, may advantageously be avoided where the waste contains zinc. In fact, these reducing agents lead precisely also, in a general way, with such waste, to the formation of the spinel phase $ZnAl_2O_4$ even within the vitroceramic phase.

The notation employed hereinabove for the chemical reactions has the advantage of facilitating the determination of the free energy of the reaction $\Delta G$. In fact, reference is made to the thermodynamic quantities already calculated for defined compounds.

The variation of standard free energy $\Delta G_o$ of the reactions of the above type is negative within a broad temperature range for numerous metals such as V, Cr, Mn, Fe, Co, Ni, Cu and Ag. The theory thus foresees the appearance of the metal by reaction of a reducing agent of carbide or other type and metal oxide within a temperature range.

Moreover, the calculation of the variation of standard free energy $\Delta G_o$ of the reaction as a function of temperature has shown that the values of $\Delta G_o$ are always negative within a broad range of temperatures within the range between 1000 and 2000 K. The values of $\Delta G_o$ for these two temperatures are, respectively, close to $-50$ and $-100$ kcal.mole$^{-1}$. The values employed for these determinations are indicated, for example, by Elliot and Gleiser (Thermochemistry for Steelmaking—Massachussetts Institute of Technology—Addison Wesley Publishing—London 1960). The principal sources of these tables are the National Bureau of Standards and the US Bureau of Mines.

According to the preferred embodiment of the method according to the invention, the waste is mixed, in the pulverulent condition, with a reducing agent selected within the group comprising nitrites, sulfides, hydrides and carbides, carbides being preferred.

The use of a carbide as reducing agent has the benefit of giving rise to the formation of graphitic carbon, that is to say of a thermodynamically stable solid compound, which will be present essentially in the vitreous phase, and easy to handle.

On the other hand, the use of nitrides, of sulfides or of hydrides leads to gaseous liberations of nitrogen, of sulfur or of hydrogen. Such gaseous compounds are, naturally, more difficult to handle than solid compounds of graphitic carbon type.

More preferably, use is made, as nitride, of a nitride selected within the group comprising calcium nitride, magnesium nitride, beryllium nitride, lanthanide nitrides, silicon nitride and boron nitride. Advantageously, it is possible to use as sulfide a sulfide selected within the group comprising sodium sulfide, iron sulfide, calcium sulfide and zinc sulfide. Advantageously, it is likewise possible to use as hydride a hydride selected within the group comprising lithium hydride, calcium hydride or lithium and aluminum double hydride. Likewise, it is possilble advantageously to use as carbide a carbide selected within the group comprising aluminum carbide and calcium carbide, calcium carbide being preferred.

If calcium carbide is particularly preferred for carrying out the method according to the invention, this is because it has intrinsically a certain number of physicochemical properties which are capable of being exploited within the context of this method.

First of all, it has a percentage of ionic character equal to 45%. This value is virtually ideal for the purpose of obtaining an optimal reaction yield.

Then, the products formed in the course of the reaction of reduction of the metal oxides are essentially calcium oxide and carbon. Calcium oxide has the advantage of being present in the liquid phase; this enhances the quality thereof.

Carbon, in its turn, is likewise present for the most part in the liquid phase. As a result of this, after the cooling step according to the method a result is the formation of a vitroceramic of black color and bright appearance. Such a vitroceramic may have a potential benefit from an industrial point of view.

Finally, the use of calcium carbide leads exclusively to liquid or solid compounds. In this case too, these compounds are easier to handle than gaseous compounds.

The reaction of oxido-reduction of metal ions by carbide ions is given hereinbelow:

$$x\ C_2^{2-} + 2\ Me^{x+} \rightarrow 2x\ C^o + 2\ Me^o.$$

The method according to the invention may give rise either to the production of a vitreous substrate to the surface of which a metal layer Me migrates, or to the production of a true biphasic material including a metal phase and an amorphous phase. In the case where the waste includes a plurality of metals, it may give rise, depending upon the value of the free energy relating to each one of the metals, to the formation of one or more metal phases which are more or less complex.

Moreover, it is possible that all these metal phases will be produced at the surface of the vitreous substance. It is likewise conceivable that they will all be contained or indeed trapped in the vitreous lattice. After a certain length of time, by reason of the density differences between the metal phase and the vitreous phase, the appearance of the metal phase at the base of the reactor will generally be observed. These phases will be separated by means known to the person skilled in the art, such as flotation, centrifuging or any other appropriate method.

According to a preferred embodiment of the method according to the invention, the reducing agent is added to said mixture in stoichiometric excess in relation to the metal contaminants. On the one hand, this increases the probability of reducing all the metal oxides involved. On the other hand, the formation of the second phase is facilitated in this manner.

According to the method according to the invention, it is not necessarily useful to provide a mineral vitrification charge. In fact, if the waste itself includes a sufficient amount of $SiO_2$ and of $Al_2O_3$, the use of such a charge is entirely superfluous.

Preferably, the fusion of said mixture is obtained by bringing said mixture to a temperature in the order of 1200 to 1600° C. This heating is maintained during a period in the order of 15 minutes. This temperature is attainable using the majority of furnaces which are available in industry. Accordingly, it is not necessary, for the performance of this method, to have recourse to particular means.

This being so, it is also possible to have recourse to a localized heating mode. In general, these modes are more complex to implement. By way of example, the mixture of waste and reducing agent is heated with the aid of a LASER or of an electron gun.

More preferably, the pulverulent mixture of waste is used with a particle size within the range between 0.5 and 200 μm.

In this way, the surface of contact between the waste and the mineral charge is optimal and the yield of the reaction is optimized.

The method according to the invention may be performed under an atmosphere free from oxygen and from water, in order to avoid any parasitic oxidation reaction. This neutral atmosphere may, for example, be constituted by an inert gas such as argon, or alternatively by nitrogen.

Moreover, again with a view to avoiding parasitic phenomena resulting from oxidation reactions, it is possible to place the mixture of reaction products in a molybdenum boat. The heating of the reaction products may, quite clearly, be effected by any appropriate means, for example in a high-frequency furnace.

Advantageously, the second metal phase is recovered by flotation, in the form of an alloy, in particular based on chromium and nickel.

Preferably, the supplementary mineral vitrification charge based on silica and alumina is constituted by other waste such as incineration slack from household garbage or from other glass makers waste such as discarded glass makers waste glass.

It is likewise possible to use a combination of such waste. By way of example, it is possible to use a combination based on Residues from the Fumes from Incineration of Household Garbage (REFIOM) including calcium and ash from thermal power plants. This waste is mixed with an alloy based on $SiO_2$ and $Al_2O_3$.

It is further possible advantageously to use this method for the purpose of processing dust including transition elements.

The method according to the invention may preferably be used for the processing of waste from the iron and steel industry such as dust from electrical or thermal power plants. It may also be used, more preferably, for the processing of catalysts from automobile mufflers or other catalysts based on metals such as: V, Cr, Co, Ni, Cu, Ag, Mo and W in the condition of oxides or of sulfides on substrates such as $SiO_2$, $Al_2O_3$ and $ZrO_2$.

It is likewise possible to process metal oxides or sulfides of the type $M_1M_2PONH$, in which $M_1$ and $M_2$ are metals, such as in particular Cr, Zr, Al or Ga. It is further possible to use this method for the purpose of separating, for example, the vanadium in AlVONH. In short, the method according to the invention may be used either with the sole objective of processing waste or alternatively with the dual objective of processing waste and reclaiming metal substances.

The method according to the invention may advantageously serve for the processing of cathode ray tubes with a view to inerting them, by separation of a lead based metal phase and a vitreous phase.

It may further be used in an advantageous fashion for the processing of Residues from the Fumes from Incineration of Household Garbage (REFIOM) with a view to inerting them.

It will be possible to have a better understanding of the invention with the aid of the nonlimiting example which follows and which constitutes an advantageous embodiment of the method according to the invention.

EXAMPLE

By way of illustration, it is possible to perform the method according to the invention to process waste originating from the iron and steel industry. This waste, which is dust from steelworks, comprises oxides of contaminant metals as well as oxides normally included in the composition of a glass.

The relative composition by weight of the dust is indicated hereinbelow:

i) Oxides of contaminant metals $Cr_2O_3$ 15 to 20%
FeO 30 to 55%
NiO 1 to 5%
MnO 3 to 5%
ZnO 5 to 10%
PbO 0.5 to 2% ii) The remainder of the composition being constituted by oxides normally included in the composition of a glass, in particular the oxides of sodium, potassium, calcium, magnesium, silicon and aluminum, corresponding to a global content within the range between 10 and 30%.

To process this waste, a mixture is formed, the composition of which by mass is the following:

i) 15 to 30% of dust from steelworks fumes of composition indicated previously,
ii) 45 to 70% of calcium silicate,
iii) 5 to 25% of $SiO_2$,
iv) 10 to 20% of reducing agent, in particular $CaC_2$.

This mixture may be brought to fusion at a temperature within the range between 1200 and 1600° C. for 15 minutes to 1 hour. This gives a solid, the examination of which by scanning microscope demonstrates that it is constituted by two distinct phases, namely a first phase which is apparently vitreous and a second metal phase. These two phases are separated from one another, the metal phase being found at the base of the reactor.

The method according to the invention has been performed by forming the mixture of approximate composition by mass indicated hereinbelow:

i) 20% of steelworks dust of composition indicated previously,
ii) 55% of $CaSiO_3$,
iii) 10% of $SiO_2$ and
iv) 15% of $CaC_2$.

The mixture was heated to 1550° C. for 15 to 30 minutes, until the expected phases appeared.

Consequently, the method according to the invention gives rise to the transformation of the metal elements in the form of oxides into metallic elements.

Accordingly, it is possible to take advantage thereof not only with a view to simple processing of waste, but also for the purpose of recovering or recycling metals.

Furthermore, the use of reducing agents of nitride type gives rise to the formation of a nitrogenous glass. This exhibits the advantage of having a very low tendency towards lixiviation. Thus, the traces of contaminants which have not passed into the separated metal phase of the glass will remain trapped in the mass of the nitrogenous glass. This gives excellent inerting; this constitutes one of the major objectives of the present invention.

It is possible to contemplate carrying out a first processing with an aforementioned ionic reducing agent, in particular a reducing agent other than a nitride, to obtain a glass comprising traces of contaminants. It is then possible to carry out a second, additional processing with a nitride.

The method according to the invention has likewise been used on glasses originating from cathode ray tubes based on lead. This involves a CORNING type 0138 glass of relative composition by weight:

$SiO_2$ 54%
$Al_2O_3$ 2%
$Na_2O$ 6%
$K_2O$ 8%
CaO 3.5%
MgO 2.5%
PbO 23%
$TiO_2$ 1–2%
$Sb_2O_3$ 0.1%

The method according to the invention has been used with this CORNING glass. To do this, a mixture was made, approximately comprising by weight:

i) 90% of CORNING glass and
ii) 10% of $CaC_2$.

The mixture was heated to 1300° C. for 10 to 30 minutes, until, in this case too, the phases prescribed according to the invention appeared.

What is claimed is:

1. Method for processing waste containing metal contaminants to make the metal contaminants inert and to provide for the recovery of the metal contaminants, the metal contaminants in the form of metals modified by carbon, oxygen, phosphorus or sulfur, the method comprising:

pulverizing the waste to a pulverulent condition;
in an inert liquid medium of molten glass, forming a mixture by mixing the waste in the pulverulent condition with an ionic reducing agent, the ionic reducing agent having a percentage of ionic character within the range between 20 and 50 percent, and having an electronegativity that is less than the electronegativity of oxygen;
producing a first liquid phase and a second metal phase through fusion of the mixture;
separating the two phases; and
solidifying each of the two phases,
wherein aluminum nitride is excluded as an ionic reducing agent in the course of the mixing operation.

2. The method of claim 1, wherein the step of mixing the waste includes further mixing the waste with a supplementary mineral vitrification charge based on at least one of silica (SiO2) and alumina ($Al_2O_3$), prior to mixing the waste with the ionic reducing agent,
wherein the ionic reducing agent is selected from at least one of nitrides, sulfides, hydrides, and carbides.

3. The method of claim 2,
wherein the nitrides are selected from the group consisting of calcium nitride, magnesium nitride, beryllium nitride, lanthanide nitrides, silicon nitride, and boron nitride,
wherein the sulfides are selected from the group consisting of sodium sulfide, iron sulfide, calcium sulfide, and zinc sulfide,
wherein the hydrides are selected from the group consisting of lithium hydride, calcium hydride, and lithium and aluminum double hydride, and
wherein the carbides are selected from the group consisting of aluminum carbide and calcium carbide.

4. The method of claim 2, wherein the supplementary mineral vitrification charge is formed from other waste, the other waste including at least one of incineration slack from household garbage and glass makers waste, wherein the glass makers waste includes discarded glass makers waste glass.

5. The method of claim 1, wherein mixing the waste with the ionic reducing agent includes adding the ionic reducing agent to the mixture in stoichiometric excess in relation to the metal contaminants.

6. The method of claim 1, wherein producing the first liquid phase and the second metal phase includes bringing the mixture to a temperature in the range of 1200 to 1600° C., the method further comprising:
storing temporarily the first phase; and
recycling of the second phase.

7. The method of claim 1, wherein pulverizing the waste includes pulverizing the waste to an average particle size within the range between 0.5 and 200 $\mu$m.

8. The method of claim 1, wherein the metal contaminant includes chromium and nickel and separating the two phases includes recovering through flotation the second metal chase in the form of one of a chromium alloy and nickel alloy.

9. The method of claim 1, wherein prior to producing the first liquid phase and the second metal phase, the mixture includes the following composition by mass:

i) 15 to 30% of a dust from steelworks fumes, ii) 45 to 70% of calcium silicate, iii) 5 to 25% of $SiO_2$, and iv) 10 to 20% $CaC_2$ as a reducing agent.

10. The method of claim 9, characterized in that the dust from steelworks fumes includes the following relative composition by weight:

i) Oxides of contaminant metals
   $Cr_2O_3$ 15 to 20%
   FeO 30 to 55%
   NiO 1 to 5%
   MnO 3 to 5%
   ZnO 5 to 10%
   PbO 0.5 to 2% ii) Glass oxides 10 to 30%, wherein the glass oxides include at least one of oxides of sodium, potassium, calcium, magnesium, silicon, and aluminum.

11. Processed waste from the iron and steel industry, wherein the processed waste is produced by the method according to one of claims 1 to 10.

12. Processed, inert waste from the residue from fumes from the incineration of household garbage wherein the processed inert waste is produced by the method according to one of claims 1 to 10.

13. Processed waste as produced by the method according to one of claims 1 to 10, wherein the processed waste includes catalysts containing at least one of the following metals: V, Cr, Ni, Cu, Ag, Mo and W in the form of one of oxides and sulfides on substrates such as $SiO_2$, $Al_2O_3$ and $ZrO_2$.

14. Processed waste produced by the method according to one of claims 1 to 10, wherein the processed waste is inert waste from cathode ray tubes and the metal phase is based on lead.

* * * * *